United States Patent
Carter et al.

(10) Patent No.: US 8,250,395 B2
(45) Date of Patent: Aug. 21, 2012

(54) DYNAMIC VOLTAGE AND FREQUENCY SCALING (DVFS) CONTROL FOR SIMULTANEOUS MULTI-THREADING (SMT) PROCESSORS

(75) Inventors: John B. Carter, Austin, TX (US); Heather L. Hanson, Austin, TX (US); Karthick Rajamani, Austin, TX (US); Freeman L. Rawson, III, Austin, TX (US); Todd J. Rosedahl, Zumbrota, MN (US); Malcolm S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 12/616,833

(22) Filed: Nov. 12, 2009

(65) Prior Publication Data

US 2011/0113270 A1    May 12, 2011

(51) Int. Cl.
*G06F 1/00* (2006.01)
*G06F 1/32* (2006.01)
*G06F 1/12* (2006.01)
*G06F 15/16* (2006.01)
*G06F 12/00* (2006.01)
*G06F 13/24* (2006.01)
*G06F 15/00* (2006.01)
*G06F 9/46* (2006.01)

(52) U.S. Cl. ........ 713/322; 713/320; 713/375; 709/248; 710/240; 710/260; 712/23; 712/215; 718/102

(58) Field of Classification Search .................. 713/320, 713/322, 375; 709/248; 710/240, 260; 712/23; 712/215; 718/102
See application file for complete search history.

(56) References Cited

U.S. PATENT DOCUMENTS

| | | | |
|---|---|---|---|
| 5,812,860 A | 9/1998 | Horden et al. | |
| 6,711,447 B1* | 3/2004 | Saeed | 700/82 |
| 6,816,809 B2* | 11/2004 | Circenis | 702/178 |
| 7,120,804 B2 | 10/2006 | Tschanz et al. | |
| 7,142,996 B2 | 11/2006 | Patel et al. | |
| 7,308,590 B2 | 12/2007 | Zagacki | |
| 7,330,798 B2 | 2/2008 | Patel et al. | |
| 7,363,176 B2 | 4/2008 | Patel et al. | |
| 7,444,497 B2 | 10/2008 | Reinhardt et al. | |
| 7,490,218 B2 | 2/2009 | Eggers et al. | |
| 7,594,128 B2* | 9/2009 | Bacchus et al. | 713/300 |
| 2005/0132038 A1 | 6/2005 | Inoue et al. | |

(Continued)

OTHER PUBLICATIONS

Antwerpen, Hans V. et al., "Energy-Aware System Design for Wireless Multimedia", ACM Digital Library, IEEE, 2004, pp. 1-6.

(Continued)

*Primary Examiner* — Stefan Stoynov
(74) *Attorney, Agent, or Firm* — Francis Lammes; Stephen J. Walder, Jr.; Libby Z. Toub

(57) ABSTRACT

A mechanism is provided for controlling operational parameters associated with a plurality of processors. A control system in the data processing system determines a utilization slack value of the data processing system. The utilization slack value is determined using one or more active core count values and one or more slack core count values. The control system computes a new utilization metric to be a difference between a full utilization value and the utilization slack value. The control system determines whether the new utilization metric is below a predetermined utilization threshold. Responsive to the new utilization metric being below the predetermined utilization threshold, the control system decreases a frequency of the plurality of processors.

20 Claims, 5 Drawing Sheets

U.S. PATENT DOCUMENTS

| | | | |
|---|---|---|---|
| 2006/0123422 A1* | 6/2006 | Felter et al. | 718/105 |
| 2007/0255516 A1 | 11/2007 | Patel et al. | |
| 2008/0005332 A1 | 1/2008 | Pande et al. | |
| 2008/0209437 A1 | 8/2008 | Emma | |
| 2011/0047401 A1* | 2/2011 | Werner | 713/500 |
| 2011/0088041 A1* | 4/2011 | Alameldeen et al. | 718/105 |

OTHER PUBLICATIONS

Hu, Shiwen et al., "Effective Management of Multiple Configurable Units Using Dynamic Optimization", ACM Digital Library, vol. 3, No. 4, Dec. 2006, pp. 477-501.

Hyman, Jr., Ransford et al., "A Strategy for Soft Error Reduction in Multi Core Designs", INSPEC/IEEE, 2009, pp. 2217-2220.

Jung, Hwisung et al., "Dynamic Power Management Under Uncertain Information", ACM Digital Library, 2007, pp. 1060-1072.

Li, Xiaodong et al., "Cross-Component Energy Management: Joint Adaptation of Processor and Memory", ACM Digital Library, vol. 4, No. 3, Article 14, Sep. 2007, 31 pages.

Pallipadi, Venkatesh, "Enhanced Intel SpeedStep Technology and Demand-Based Switching on Linux", http://software.intel.com/en-us/articles/enhanced-intel-speedstepr-technology-and-demand-based-switching-on-linux/, downloaded Oct. 12, 2009, 11 pages.

Yang, Hua et al., "Redundant Multithreading Architecture Overview", INSPEC/Wuhan University Journal of Natural Sciences, vol. 11, No. 6, Nov. 2006, pp. 1793-1796.

* cited by examiner

DYNAMIC VOLTAGE AND FREQUENCY SCALING (DVFS) CONTROL FOR SIMULTANEOUS MULTI-THREADING (SMT) PROCESSORS

GOVERNMENT RIGHTS

This invention was made with Government support under DARPA, HR0011-07-9-0002. THE GOVERNMENT HAS CERTAIN RIGHTS IN THIS INVENTION.

BACKGROUND

The present application relates generally to an improved data processing apparatus and method and more specifically to mechanisms for controlling dynamic voltage and frequency scaling (DVFS) for simultaneous multi-threading (SMT) processors.

Dynamic Voltage and Frequency Scaling (DVFS) is a common technique for managing power. Most recently DVFS has been applied in the context of server and new benchmarks for power/performance efficiency. The challenge in using DVFS is determining what frequency to use, since the frequency determines the voltages to be used. Lowering of frequency and thus voltage results in less power consumption. The usual relationship between frequency/voltage and power consumed is non-linear with a significant benefit from being able to operate at lower frequency and voltage in terms of energy efficiency for the work to be completed. However, the complexity of new generation processors makes older utilization based techniques overly conservative in detecting slack in computing systems. Detecting slack may provide guidance on when frequency can be lowered to improve energy efficiency and still meet required throughput for a running application.

SUMMARY

In one illustrative embodiment, a method, in a data processing system, is provided for controlling operational parameters associated with a plurality of processors. The illustrative embodiment determines a utilization slack value of the data processing system, wherein the utilization slack value is determined using one or more active core count values and one or more slack core count values. The illustrative embodiment computes a new utilization metric to be a difference between a full utilization value and the utilization slack value. The illustrative embodiment determines whether the new utilization metric is below a predetermined utilization threshold. The illustrative embodiment decreases a frequency of the plurality of processors in response to the new utilization metric being below the predetermined utilization threshold.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for controlling dynamic voltage and frequency scaling (DVFS) for simultaneous multi-threading (SMT) processors. The illustrative embodiments consider a broader pool of processors to detect slack within a data processing system, which may be referred to as a control domain. Underutilization by any processor core within the processors of the control domain or any processor core within the processors of the control domain currently being used is an indication to exploit slack. Exploitation of slack means lowering frequency for the control domain or subset of the control domain. The illustrative embodiments take into consideration the way threads interact in a SMT data processing system to determine whether a cycle gets used within the core. That is, sometimes the threads will get scheduled together and show up as slack and sometimes the threads will not get scheduled together and not show slack. Thus, the illustrative embodiments look at a larger pool of processor cores and/or increase the sampling rate on the utilization sensor within a core in order to find slack in the data processing system.

Figure 1:
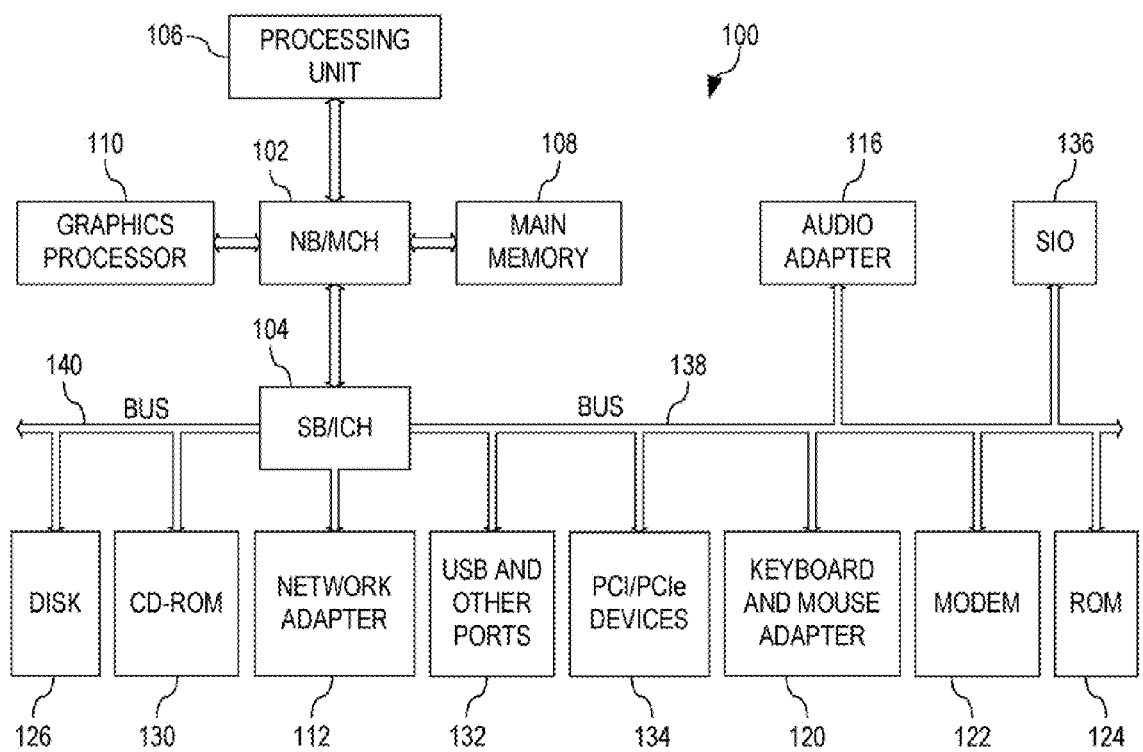
FIG. 1 shows a block diagram of an example data processing system in which aspects of the illustrative embodiments may be implemented.
Figure 2:
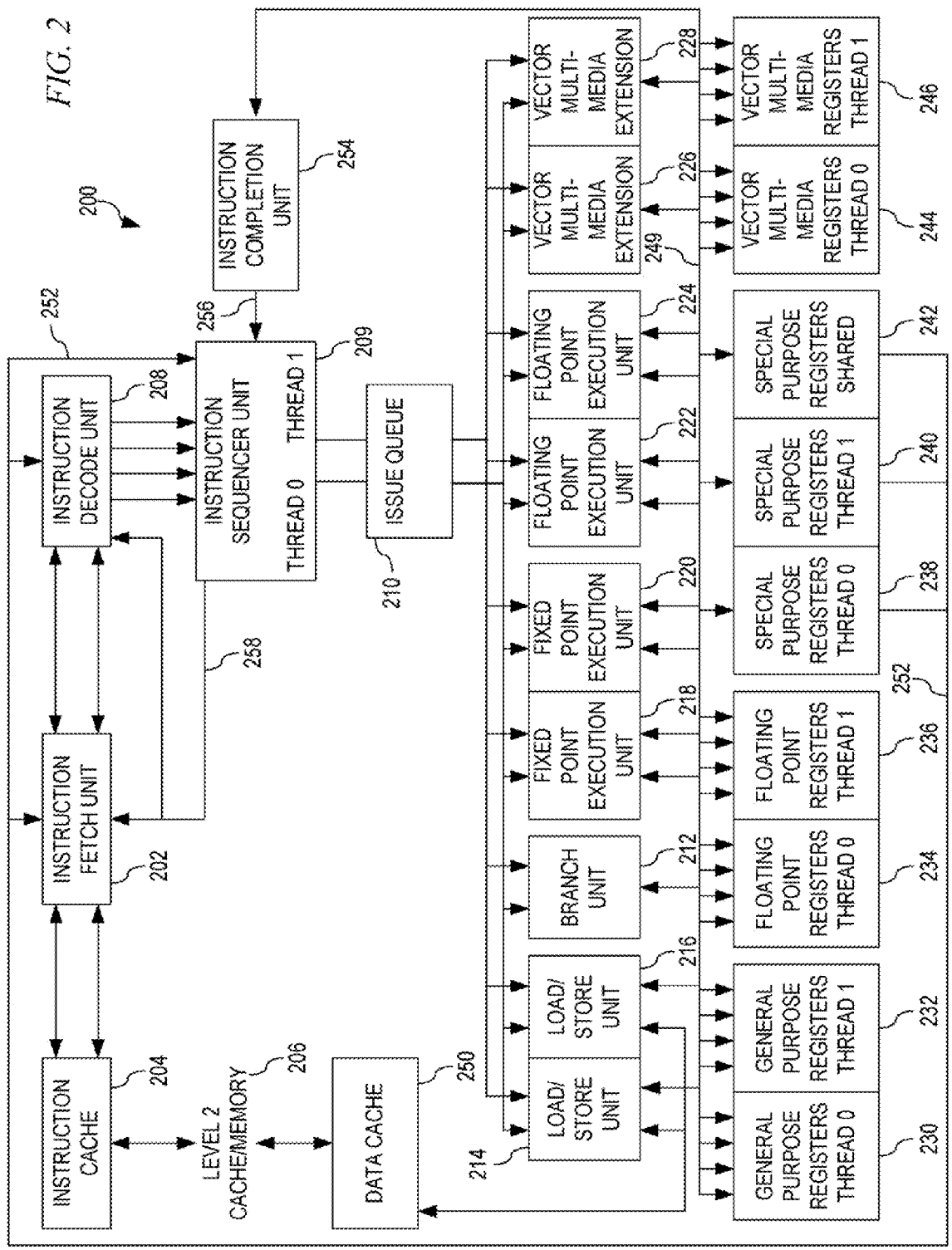
FIG. 2 depicts an exemplary block diagram of a conventional dual threaded processor design showing functional units and registers in accordance with an illustrative embodiment.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation controlling dynamic voltage and frequency scaling (DVFS) for simultaneous multi-threading (SMT) processors, this is only an example and is not intended to state or imply any limitation with regard to the features of the present invention. To the contrary, the illustrative embodiments are intended to include distributed data processing environments and embodiments in which dynamic voltage and frequency scaling (DVFS) control may be used for simultaneous multi-threading (SMT) processors.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to FIG. 1, a block diagram of an example data processing system is shown in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Processor unit 106 serves to execute instructions for software that may be loaded into main memory 108. Processor unit 106 may be a set of one or more processors and/or may be a multi-processor core, depending on the particular implementation. Further, processor unit 106 may be implemented using one or more heterogeneous processor systems in which a main processor is present with secondary processors on a single chip. As another illustrative example, processor unit 106 may be a symmetric multi-processor system containing multiple processors of the same type. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ System P® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

Referring to FIG. 2, an exemplary block diagram of a conventional dual threaded processor design showing functional units and registers is depicted in accordance with an illustrative embodiment. Processor 200 may be implemented as processing unit 106 in FIG. 1 in these illustrative examples. Processor 200 comprises a single integrated circuit superscalar microprocessor with dual-thread simultaneous multi-threading (SMT) that may also be operated in a single threaded mode. Accordingly, as discussed further herein below, processor 200 includes various units, registers, buffers, memories, and other sections, all of which are formed by integrated circuitry. Also, in an illustrative embodiment, processor 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for up to two threads at the same time. Instruction decode unit 208 decodes multiple instructions for up to two threads at the same time and passes decoded instructions to instruction sequencer unit (ISU) 209.

Processor 200 may also include issue queue 210, which receives decoded instructions from ISU 209. Instructions are stored in the issue queue 210 while awaiting dispatch to the appropriate execution units. For an out-of order processor to operate in an in-order manner, ISU 209 may selectively issue instructions quickly using false dependencies between each instruction. If the instruction does not produce data, such as in a read after write dependency, ISU 209 may add an additional source operand (also referred to as a consumer) per instruction to point to the previous target instruction (also referred to as a producer). Issue queue 210, when issuing the producer, may then wakeup the consumer for issue. By introducing false dependencies, a chain of dependent instructions may then be created, whereas the instructions may then be issued only in-order. ISU 209 uses the added consumer for instruction scheduling purposes and the instructions, when executed, do not actually use the data from the added dependency. Once ISU 209 selectively adds any required false dependencies, then issue queue 210 takes over and issues the instructions in order for each thread, and outputs or issues instructions for each thread to execution units 212, 214, 216, 218, 220, 222, 224, 226, and 228 of the processor. This process will be described in more detail in the following description.

In an illustrative embodiment, the execution units of the processor may include branch unit 212, load/store units (LSUA) 214 and (LSUB) 216, fixed point execution units (FXUA) 218 and (FXUB) 220, floating point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored once an instruction has completed execution. ARFs 230, 232, 234, 236, 238, 240, 242, 244, and 246 may store data separately for each of the two threads and by the type of instruction, namely general purpose registers (GPRs) 230 and 232, floating point registers (FPRs) 234 and 236, special purpose registers (SPRs) 238 and 240, and vector registers (VRs) 244 and 246. Separately storing completed data by type and by thread assists in reducing processor contention while processing instructions.

The processor additionally includes a set of shared special purpose registers (SPR) 242 for holding program states, such as an instruction pointer, stack pointer, or processor status word, which may be used on instructions from either or both threads. Execution units 212, 214, 216, 218, 220, 222, 224, 226, and 228 are connected to ARFs 230, 232, 234, 236, 238, 240, 242, 244, and 246 through simplified internal bus structure 249.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 output their destination register operand data to SPRs 238, 240, and 242 when the instruction has passed the point of flushing in the pipeline. Program states, such as an instruction pointer, stack pointer, or processor status word, stored in SPRs 238 and 240 indicate thread priority 252 to ISU 209. During execution of an instruction, VMXA 226 and VMXB 228 output their destination register operand data to VRs 244 and 246 when the instruction has passed the point of flushing in the pipeline.

Data cache 250 may also have associated with it a non-cacheable unit (not shown) which accepts data from the processor and writes it directly to level 2 cache/memory 206. In this way, the non-cacheable unit bypasses the coherency protocols required for storage to cache.

In response to the instructions input from instruction cache 204 and decoded by instruction decode unit 208, ISU 209 selectively dispatches the instructions to issue queue 210 and then onto execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed point mathematical operations on register source operands, such as addition, subtraction, ANDing, ORing and XORing. FPUA 222 and FPUB 224 execute floating point mathematical operations on register source operands, such as floating point multiplication and division. LSUA 214 and LSUB 216 execute load and store instructions, which move operand data between data cache 250 and ARFs 230, 232, 234, and 236. VMXA 226 and VMXB 228 execute single instruction operations that include multiple data. Branch unit 212 executes branch instructions which conditionally alter the flow of execution through a program by modifying the instruction address used by IFU 202 to request instructions from instruction cache 204.

Instruction completion unit 254 monitors internal bus structure 249 to determine when instructions executing in execution units 212, 214, 216, 218, 220, 222, 224, 226, and 228 are finished writing their operand results to ARFs 230, 232, 234, 236, 238, 240, 242, 244, and 246. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 254 monitors for the completion of instructions, and sends control information 256 to ISU 209 to notify ISU 209 that more groups of instructions can be dispatched to execution units 212, 214, 216, 218, 220, 222, 224, 226, and 228. ISU 209 sends dispatch signal 258, which serves as a throttle to bring more instructions down the pipeline to the dispatch unit, to IFU 202 and instruction decode unit 208 to indicate that it is ready to receive more decoded instructions. While processor 200 provides one detailed description of a single integrated circuit superscalar microprocessor with dual-thread simultaneous multi-threading (SMT) that may also be operated in a single threaded mode, the illustrative embodiments are not limited to such microprocessors. That is, the illustrative embodiments may be implemented in any type of processor using a pipeline technology.

Again, the illustrative embodiments provide a mechanism for controlling dynamic voltage and frequency scaling (DVFS) for simultaneous multi-threading (SMT) processors. The illustrative embodiments consider a broader pool of processors to detect slack within a data processing system, which may be referred to as a control domain. The illustrative embodiments take into consideration the way threads interact in a SMT data processing system to determine whether a cycle gets used within the core. Thus, the illustrative embodiments look at a larger pool of processor cores and/or increase the sampling rate on the utilization sensor within a core in order to find slack in the data processing system.

Figure 3:
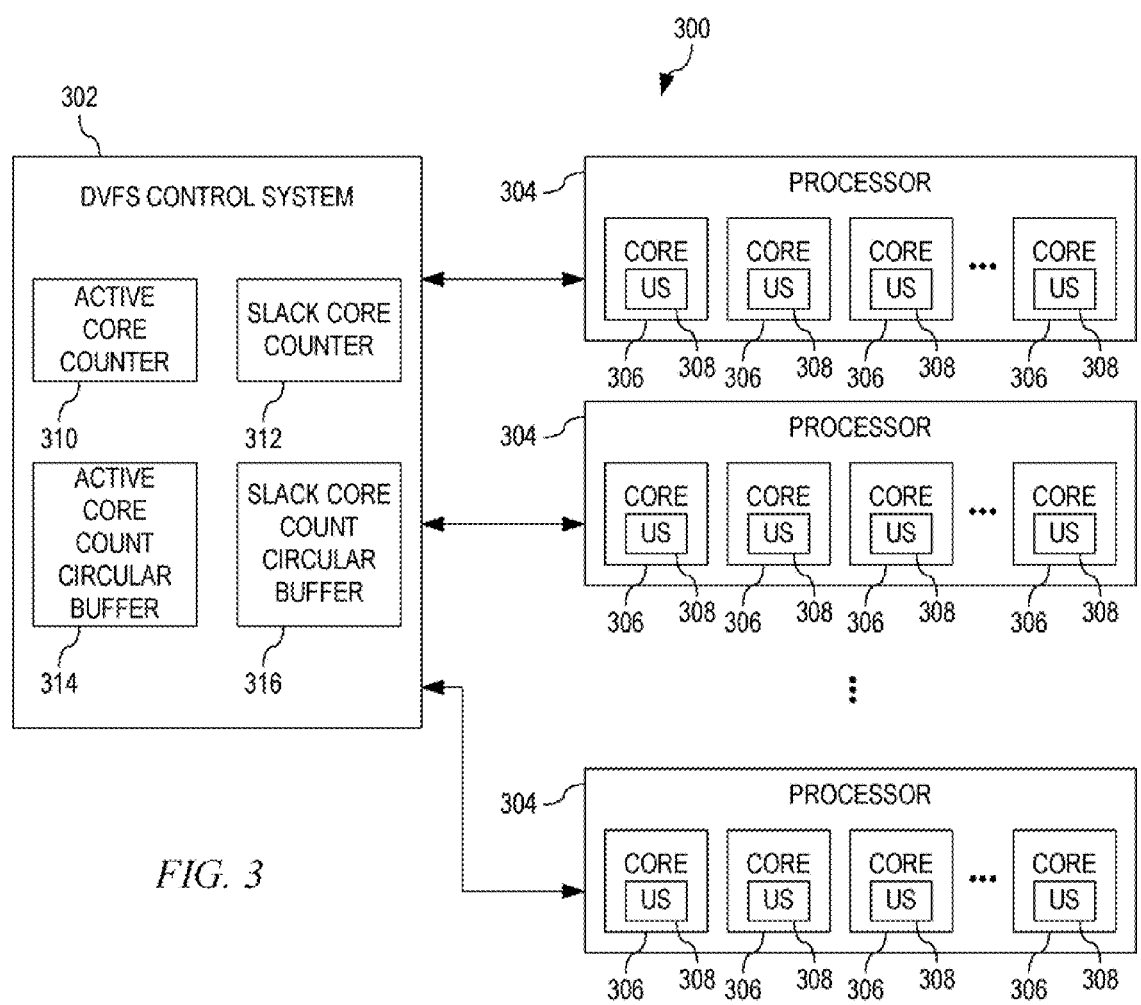
FIG. 3 depicts an exemplary block diagram of a dynamic voltage and frequency scaling (DVFS) control system in accordance with an illustrative embodiment.

FIG. 3 depicts an exemplary block diagram of a dynamic voltage and frequency scaling (DVFS) control system in accordance with an illustrative embodiment. Dynamic voltage and frequency scaling (DVFS) control system 302 may be implemented in data processing system 300 which comprises a plurality of processors 304 and may control the operational parameters of processors 304, such as frequency, voltage, or the like. Each of processors 304 may further comprise a plurality of processor cores 306. In order to compute a utilization associated with each of processor cores 306, each of processor cores 306 comprises core utilization sensor 308. With the illustrative embodiments, core utilization sensor 308 may be implemented using various methods. For example, in one implementation, core utilization sensor 308 may be implemented such that the active cycles and the total cycles of processor core 306 are counted over a predetermined time period and the utilization is calculated by dividing the active cycles by the total cycles of processor core 306. In another example, core utilization sensor 308 may be implemented such that a run_cycles counter is incremented if any thread has a run_latch set and then an average of the count of all of the thread's run_cycles counter may be used to compute the core utilization. Additionally, a maximum of a simple moving average (SMA) may be maintained for each thread's run_cycles counter and the maximum of these SMA's is used to compute the core utilization.

Regardless of the method each of core utilization sensors 308 use to determine the utilization for the respective one of processor cores 306, DVFS control system 302 performs a per core measurement of the core utilization of each of core utilization sensors 308 at regular time intervals, such as every 32 milliseconds, every 64 milliseconds, or some other predetermined time interval. During the per core measurements, DVFS control system 302 determines if processor core 306 is active. That is, if the core utilization identified by core utilization sensor 308 of processor core 306 is greater than a predetermined active threshold, then DVFS control system 302 considers processor core 306 active and DVFS control system 302 then increments active core counter 310 by 1. DVFS control system 302 may use a predetermined active threshold, such as 60%, 65%, or the like, based on a result of tuning of data processing system 300. Those processor cores 306 that are not above the predetermined active threshold are not used in determining the utilization of data processing system 300 as one of those processor cores 306 may already be in a sleep mode, only slightly utilized, or the like, thereby those processor cores 306 are not an important factor in the selection of the optimum DVFS setting. The optimum DVFS settings may be chosen primarily to just meet the throughput needs of the active cores.

If DVFS control system 302 determines that processor core 306 is active, then DVFS control system 302 determines if the active processor core 306 has slack. That is, DVFS control system 302 determines if the core utilization identified by core utilization sensor 308 of processor core 306 is less than a predetermined slack threshold. If the core utilization identified by core utilization sensor 308 of processor core 306 is less than the predetermined slack threshold, then DVFS control system 302 declares processor core 306 to have slack and DVFS control system 302 increments slack core counter 312 by 1. DVFS control system 302 may use a predetermined slack threshold, such as 97%, 98%, or the like, which is also the result of tuning of data processing system 300.

Both active core counter 310 and slack core counter 312 are maintained over a spatial and temporal period that is programmable and predetermined, such as every 64 millisecond, every 128 milliseconds, or the like. DVFS control system 302 uses another predetermined time period at which, at the end of the predetermined time period, DVFS control system 302 uses the values of active core counter 310 and slack core counter 312 to compute the new utilization slack for data processing system 300. Once DVFS control system 302 reads the value from active core counter 310 and slack core counter 312, DVFS control system 302 places the values into active core count circular buffer 314 and slack core count circular buffer 316 and then resets active core counter 310 and slack core counter 312. DVFS control system 302 may use one or more values from each of active core count circular buffer 314 and slack core count circular buffer 316 to determine a utilization slack value of data processing system 300 as a percentage using the following equation:

$$\text{Utilization Slack} = 100 * (\text{Slack Core Count}/\text{Active Core Count})$$

For example, in a data processing system that has 128 processor cores, if active core counter 310 indicates that all of the 128 processor cores 306 are above the predetermined active threshold and slack core counter 312 indicates that none of the 128 processor cores 306 are less than the predetermined slack threshold then the determined utilization slack would be:

Utilization Slack=100*(0/128)=0%

As another example, in a data processing system that has 128 processor cores, if active core counter 310 indicates that none of the 128 processor cores 306 are above the predetermined active threshold and, thus, slack core counter 312 indicates that none of the 128 processor cores 306 are less than the predetermined slack threshold then the determined utilization slack would be:

Utilization Slack=100*(0/0)=0%

However, in this special case, where the denominator is 0 then DVFS control system 302 considers the utilization slack to be 100% and decreases the frequency of data processing system 300 by one step size. A step size may be a selectable percentage of the operating frequency of the processors 304 such as 28 MHz, 32 MHz, or the like.

As another example, in a data processing system that has 128 processor cores, if active core counter 310 indicates that all of the 128 processor cores 306 are above the predetermined active threshold and slack core counter 312 indicates that two of the 128 processor cores 306 are greater than the predetermined slack threshold then the determined utilization slack would be:

Utilization Slack=100*(126/128)=98.43%

DVFS control system 302 then computes a new utilization metric to be a difference between a full utilization value and the utilization slack value, such as a new utilization metric that is equal to 100 minus the utilization slack value. DVFS control system 302 then compares the new utilization metric value to identify whether the new utilization metric value is above or below a predetermined utilization threshold. If the new utilization metric value is above the predetermined utilization threshold, then DVFS control system 302 identifies data processing system 300 as being over utilized and increases the frequency of data processing system 300 by one step size. If the new utilization metric value is below the predetermined utilization threshold, then DVFS control system 302 identifies data processing system 300 as being under utilized and decreases the frequency of data processing system 300 by one step size. If the new utilization metric value is equal to the predetermined utilization threshold, then DVFS control system 302 identifies data processing system 300 as being optimally utilized and performs no action on the frequency of data processing system 300. By lowering the frequency by just one step, all voltages of all chips in the system or control domain drop a little bit, spreading out the work so that all cores will remain without slack, and operating at a more energy efficient point.

While the above illustrative embodiment changes the frequency of all processor cores 306 in data processing system 300, in another illustrative embodiment the utilization slack may be determined based on processor cores within a specific processor, processor cores within a specified group of processor, or the like, and, thus, the frequency may be set independently for those processor cores within a specific processor, processor cores within a specified group of processor, or the like, individually from other processor cores in data processing system 300.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4A:
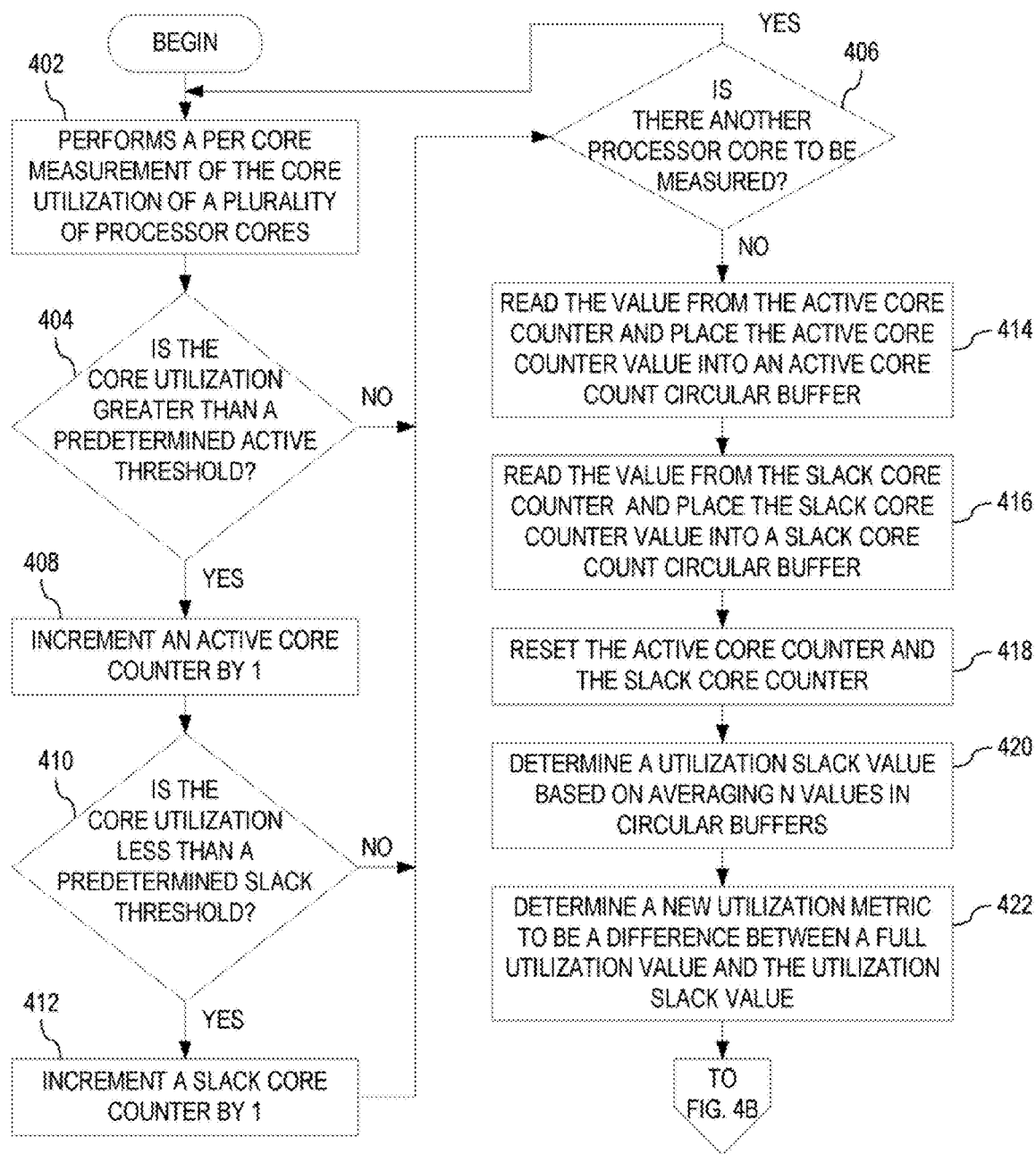
FIGS. 4A and 4B provide a flowchart outlining example operations of calculating utilization slack of a data processing system and controlling the operation parameters of the data processing system in accordance with an illustrative embodiment.
Figure 4B:
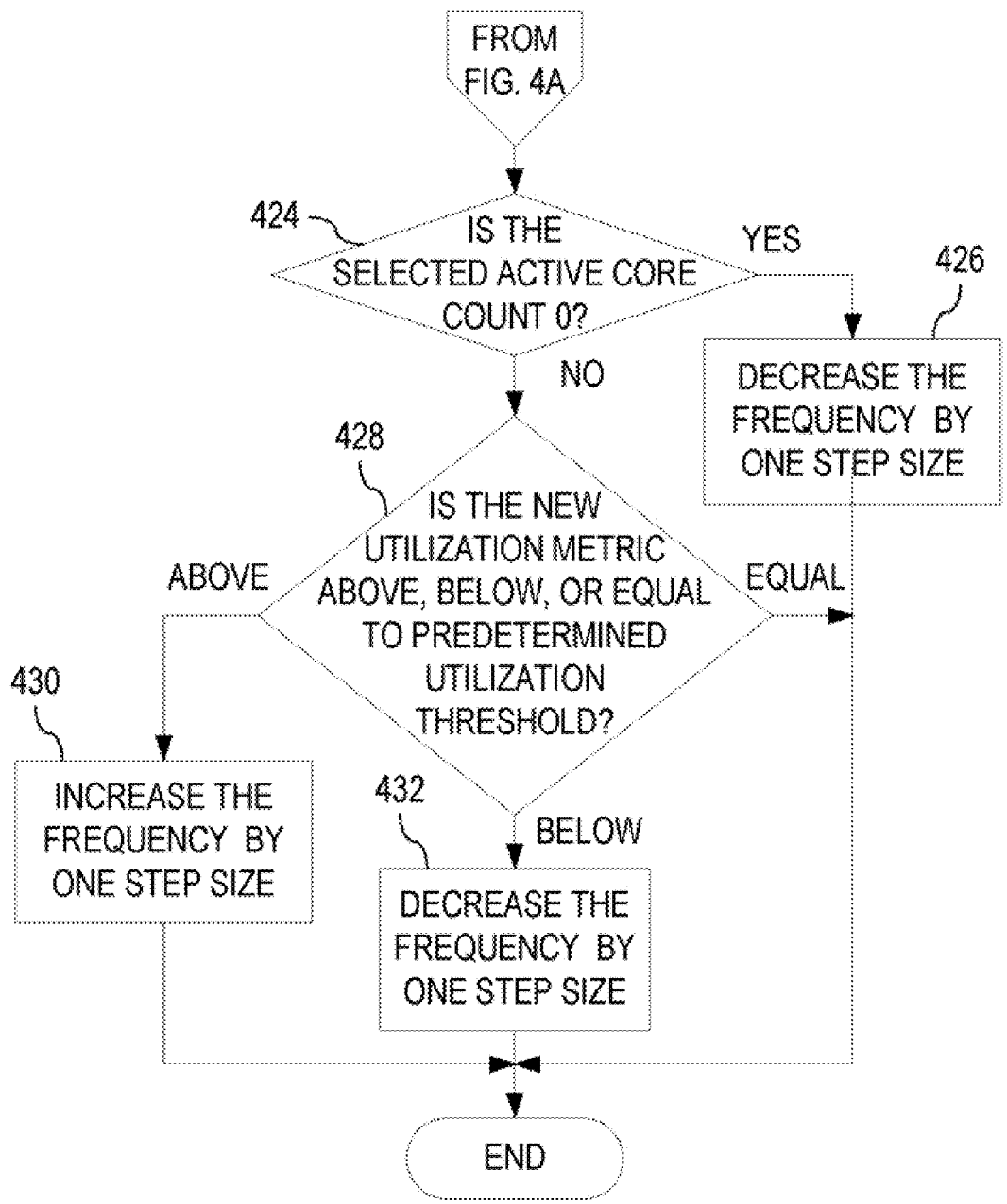

Referring now to FIGS. 4A and 4B, these figures provide a flowchart outlining example operations of calculating utilization slack of a data processing system and controlling the operation parameters of the data processing system in accordance with an illustrative embodiment. As the operation begins, a dynamic voltage and frequency scaling (DVFS) control system in a data processing system performs a per core measurement of the core utilization of each of a plurality of core utilization sensors associated with a plurality of processor cores in the data processing system (step 402). During the per core measurements, the DVFS control system determines whether each processor core is active by determining whether the core utilization identified by the core utilization sensor of the processor core is greater than a predetermined active threshold (step 404). If at step 404 the core utilization is below the predetermined active threshold, then the DVFS control system determines whether there is another processor core to be measured (step 406). If at step 406 there is another processor core to be measured, then the operation returns to step 402 in order to analyze the next processor core.

If at step 404 the core utilization is above the predetermined active threshold, then the DVFS control system increments an active core counter by 1 (step 408). The DVFS control system then determines whether the active processor core has slack by determining whether the core utilization of the processor core is less than a predetermined slack threshold (step 410). If at step 410 the core utilization is less than the predetermined slack threshold, then the DVFS control system increments a slack core counter by 1 (step 412), with the operation proceeding to step 406. If at step 410 the core utilization is more than the predetermined slack threshold, then operation proceeds to step 406.

If at step 406 there are no more processor cores to be measured, then the DVFS control system reads an active core counter value from the active core counter and places the active core counter value into an active core count circular buffer (step 414). The DVFS control system also reads a slack core counter value from the slack core counter and places the slack core counter value into a slack core count circular buffer (step 416). The DVFS control system then resets the active core counter and the slack core counter (step 418).

The DVFS control system then uses one or more values (the number of values is a programmable selection) from the active core count circular buffer and the slack core count circular buffer to determine a utilization slack value of data processing system (step 420). The DVFS control system computes the utilization slack value based on the sum of slack core counts divided by the sum of active core counts. In addition, the DVFS control system computes a new utilization metric to be a difference between a full utilization value and the utilization slack value, such as a new utilization metric that is equal to 100 minus the utilization slack value (step 422). The DVFS control system determines whether the sum of the values read from the active core count circular buffer is zero (step 424). If at step 424 the sum of the active core counts is zero, then the DVFS control system decreases the frequency of the plurality of processors by one step size (step 426), with the operation terminating thereafter. If at step 424 the sum of the active core counts is not zero, the DVFS control system determines whether the new utilization metric value is above, below, or equal to a predetermined utilization threshold (step 428).

If at step 428 the DVFS control system determines that the new utilization metric is above the predetermined utilization threshold, then the DVFS control system identifies data processing system as being over utilized and increases the frequency of the plurality of processors by one step size (step 430), with the operation terminating thereafter. If at step 428 the DVFS control system determines that the new utilization metric is below the predetermined utilization threshold, then the DVFS control system identifies the data processing system as being under utilized and decreases the frequency of the plurality of processors by one step size (step 432), with the operation terminating thereafter. If at step 428 the DVFS control system determines that the new utilization metric is equal to the predetermined utilization threshold, then the DVFS control system identifies data processing system as being optimally utilized and the operation terminates.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for controlling dynamic voltage and frequency scaling (DVFS) for simultaneous multi-threading (SMT) processors. The illustrative embodiments consider a broader pool of processors to detect slack within a data processing system, which may be referred to as a control domain. Underutilization by any processor core within the processors of the control domain or any processor core within the processors of the control domain currently being used is an indication to exploit slack. Exploitation of slack means lowering frequency for the control domain or subset of the control domain. The illustrative embodiments take into consideration the way threads interact in a SMT data processing system to determine whether a cycle gets used within the core. That is, sometimes the threads will get scheduled together and show up as slack and sometimes the threads will not get scheduled together and not show slack. Thus, the illustrative embodiments look at a larger pool of processor cores and/or increase the sampling rate on the utilization sensor within a core in order to find slack in the data processing system.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for controlling operational parameters associated with a plurality of processors, the method comprising:
   determining, by a control system in the data processing system, a utilization slack value of the data processing system, wherein the utilization slack value is determined using one or more active core count values and one or more slack core count values;
   computing, by the control system, a new utilization metric to be a difference between a full utilization value and the utilization slack value;
   determining, by the control system, whether the new utilization metric is below a predetermined utilization threshold; and
   responsive to the new utilization metric being below the predetermined utilization threshold, decreasing, by the control system, a frequency of the plurality of processors.

2. The method of claim 1, further comprising:
   determining, by the control system, whether the new utilization metric is above the predetermined utilization threshold; and
   responsive to the new utilization metric being above the predetermined utilization threshold, increasing, by the control system, the frequency of data processing system by one step size.

3. The method of claim 1, further comprising:
   determining, by the control system, whether the new utilization metric is equal to the predetermined utilization threshold; and
   responsive to the new utilization metric being equal to the predetermined utilization threshold, neither increasing nor decreasing, by the control system, the frequency of the data processing system.

4. The method of claim 1, further comprising:
   determining, by the control system, whether the sum of one or more active core count values is zero; and
   responsive to sum of the one or more active core count values being zero, decreasing, by the control system, the frequency of the data processing system by one step size.

5. The method of claim 1, wherein the utilization slack value is determined by:
   reading, by the control system, an active core counter value from an active core counter;
   placing, by the control system, the active core counter value into an active core count circular buffer;
   reading, by the control system, a slack core count value from a slack core counter;
   placing, by the control system, the slack core counter value into a slack core count circular buffer; and
   determining, by the control system, the utilization slack value using the one or more active core count values from the active core count circular buffer and the one or more slack core count values from the slack core count circular buffer using the following equation:

Utilization Slack=100*(Slack Core Count/Active Core Count).

6. The method of claim 5, wherein the active core counter and the slack core counter obtain their values by:
   performing, by the control system, a per core measurement of a core utilization of each of a plurality of processor cores in the plurality of processors in the data processing system;
   determining, by the control system, whether each processor core in the plurality of processor cores is active thereby forming an active processor core, wherein the control system determines whether each processor core is active by determining whether the core utilization identified by a core utilization sensor of the processor core is greater than a predetermined active threshold;
   responsive to the core utilization being above the predetermined active threshold, incrementing, by the control system, an active core counter by 1;
   determining, by the control system, whether the active processor core has slack, wherein the control system determines whether the active processor core has slack by determining whether the core utilization of the processor core is less than a predetermined slack threshold; and
   responsive to the core utilization being below the predetermined slack threshold, incrementing, by the control system, a slack core counter by 1.

7. The method of claim 5, further comprising:
resetting, by the control system, the active core counter and the slack core counter after the values are read by the control system.

8. The method of claim 1, wherein the new utilization metric is calculated to be 100 minus the utilization slack value, wherein the frequency of the plurality of processors is decreased by one step size, and wherein the one step size is a selectable percentage of an operating frequency of the plurality of processors.

9. A computer program product comprising a computer readable storage medium having a computer readable program stored therein, wherein the computer readable program, when executed on a computing device, causes the computing device to:
 determine a utilization slack value of the data processing system, wherein the utilization slack value is determined using one or more active core count values and one or more slack core count values;
 compute a new utilization metric to be a difference between a full utilization value and the utilization slack value;
 determine whether the new utilization metric is below a predetermined utilization threshold; and
 responsive to the new utilization metric being below the predetermined utilization threshold, decrease a frequency of a plurality of processors.

10. The computer program product of claim 9, wherein the computer readable program further causes the computing device to:
 determine whether the new utilization metric is above the predetermined utilization threshold; and
 responsive to the new utilization metric being above the predetermined utilization threshold, increase the frequency of data processing system by one step size.

11. The computer program product of claim 9, wherein the computer readable program further causes the computing device to:
 determine whether the new utilization metric is equal to a predetermined utilization threshold; and
 responsive to the new utilization metric being equal to the predetermined utilization threshold, neither increasing nor decreasing the frequency of the data processing system.

12. The computer program product of claim 9, wherein the computer readable program further causes the computing device to:
 determine whether the sum of one or more active core count values is zero; and
 responsive to sum of the one or more active core count values being zero, decrease the frequency of the data processing system by one step size.

13. The computer program product of claim 9, wherein the computer readable program to determine the utilization slack value further causes the computing device to:
 read an active core counter value from an active core counter;
 place the active core counter value into an active core count circular buffer;
 read a slack core count value from a slack core counter;
 place the slack core counter value into a slack core count circular buffer; and
 determine the utilization slack value using the one or more active core count values from the active core count circular buffer and the one or more slack core count values from the slack core count circular buffer using the following equation:

$$\text{Utilization Slack} = 100 * (\text{Slack Core Count}/\text{Active Core Count}).$$

14. The computer program product of claim 13, wherein the computer readable program causes the active core counter and the slack core counter to obtain their values by further causing the computing device to:
 perform a per core measurement of a core utilization of each of a plurality of processor cores in the plurality of processors in the data processing system;
 determine whether each processor core in the plurality of processor cores is active thereby forming an active processor core, wherein the control system determines whether each processor core is active by determining whether the core utilization identified by a core utilization sensor of the processor core is greater than a predetermined active threshold;
 responsive to the core utilization being above the predetermined active threshold, increment an active core counter by 1;
 determine whether the active processor core has slack, wherein the control system determines whether the active processor core has slack by determining whether the core utilization of the processor core is less than a predetermined slack threshold; and
 responsive to the core utilization being below the predetermined slack threshold, increment a slack core counter by 1.

15. An apparatus, comprising:
 a processor; and
 a memory coupled to the processor, wherein the memory comprises instructions which, when executed by the processor, cause the processor to:
 determine a utilization slack value of the data processing system, wherein the utilization slack value is determined using one or more active core count values and one or more slack core count values;
 compute a new utilization metric to be a difference between a full utilization value and the utilization slack value;
 determine whether the new utilization metric is below a predetermined utilization threshold; and
 responsive to the new utilization metric being below the predetermined utilization threshold, decrease a frequency of a plurality of processors.

16. The apparatus of claim 15, wherein the instructions further cause the processor to:
 determine whether the new utilization metric is above the predetermined utilization threshold; and
 responsive to the new utilization metric being above the predetermined utilization threshold, increase the frequency of data processing system by one step size.

17. The apparatus of claim 15, wherein the instructions further cause the processor to:
 determining whether the new utilization metric is equal to a predetermined utilization threshold; and
 responsive to the new utilization metric being equal to the predetermined utilization threshold, neither increasing nor decreasing the frequency of the data processing system.

18. The apparatus of claim 15, wherein the instructions further cause the processor to:
 determine whether the sum of one or more active core count values is zero; and responsive to sum of the one or more active core count values being zero, decrease the frequency of the data processing system by one step size.

19. The apparatus of claim 15, wherein the instructions to determine the utilization slack value further causes the processor to:

read an active core counter value from an active core counter;
place the active core counter value into an active core count circular buffer;
read a slack core count value from a slack core counter;
place the slack core counter value into a slack core count circular buffer; and
determine the utilization slack value using the one or more active core count values from the active core count circular buffer and the one or more slack core count values from the slack core count circular buffer using the following equation:

Utilization Slack=100*(Slack Core Count/Active Core Count).

20. The apparatus of claim 19, wherein the instructions cause the active core counter and the slack core counter to obtain their values by further causing the processor to:

perform a per core measurement of a core utilization of each of a plurality of processor cores in the plurality of processors in the data processing system;
determine whether each processor core in the plurality of processor cores is active thereby forming an active processor core, wherein the control system determines whether each processor core is active by determining whether the core utilization identified by a core utilization sensor of the processor core is greater than a predetermined active threshold;
responsive to the core utilization being above the predetermined active threshold, increment an active core counter by 1;
determine whether the active processor core has slack, wherein the control system determines whether the active processor core has slack by determining whether the core utilization of the processor core is less than a predetermined slack threshold; and
responsive to the core utilization being below the predetermined slack threshold, increment a slack core counter by 1.

* * * * *